C. E. SQUIRES.
DEMONSTRATING APPARATUS FOR STEAM TRAPS.
APPLICATION FILED AUG. 4, 1910.

979,716.

Patented Dec. 27, 1910.

2 SHEETS—SHEET 1.

ATTEST
E. M. Fisher
J. C. Musson

INVENTOR
CHARLES E. SQUIRES.
By Fisher & Mott
ATT'YS.

UNITED STATES PATENT OFFICE.

CHARLES E. SQUIRES, OF CLEVELAND, OHIO.

DEMONSTRATING APPARATUS FOR STEAM-TRAPS.

979,716.   Specification of Letters Patent.   Patented Dec. 27, 1910.

Application filed August 4, 1910. Serial No. 575,544.

*To all whom it may concern:*

Be it known that I, CHARLES E. SQUIRES, citizen of the United States, residing at Cleveland, in the county of Cuyahoga and State of Ohio, have invented certain new and useful Improvements in Demonstrating Apparatus for Steam-Traps, of which the following is a specification.

My invention relates to a device for demonstrating the operation of steam traps, and the object of the invention is to provide means for a salesman to take onto the road and show how a steam trap operates under normal conditions, as when coupled up with a steam line or pipe in which such traps are usually located, and particularly to show that there is no condensation or waste of steam by the use of the trap as it is ordinarily employed to take care of steam condensations.

Figure 1:
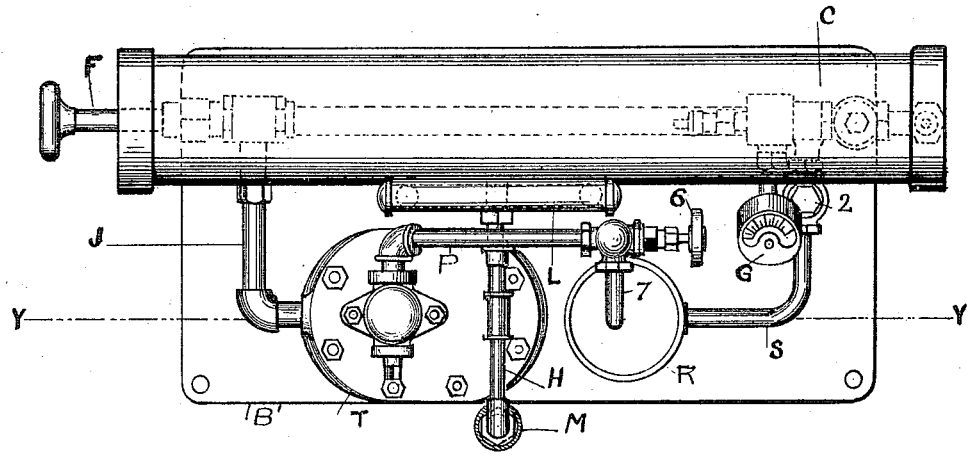
Figure 2:
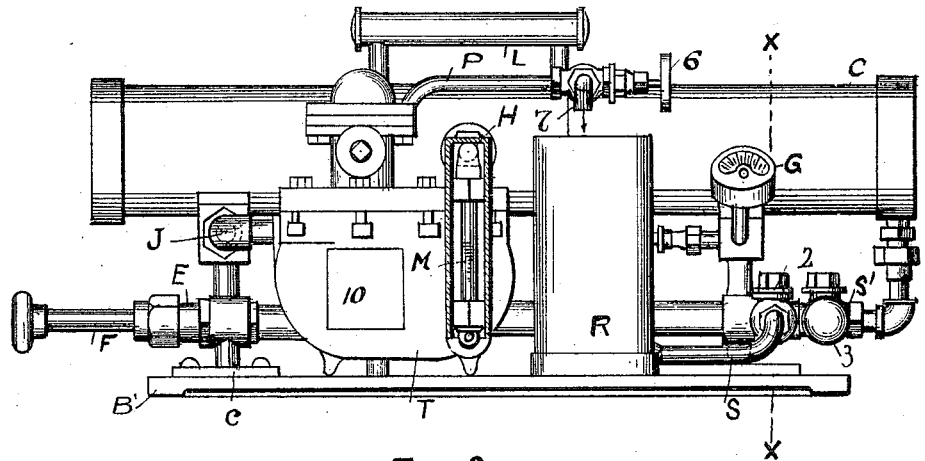
Figure 3:
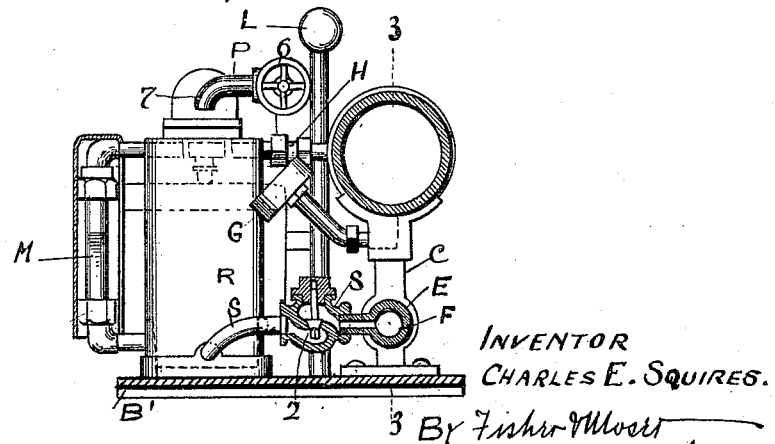
Figure 4:
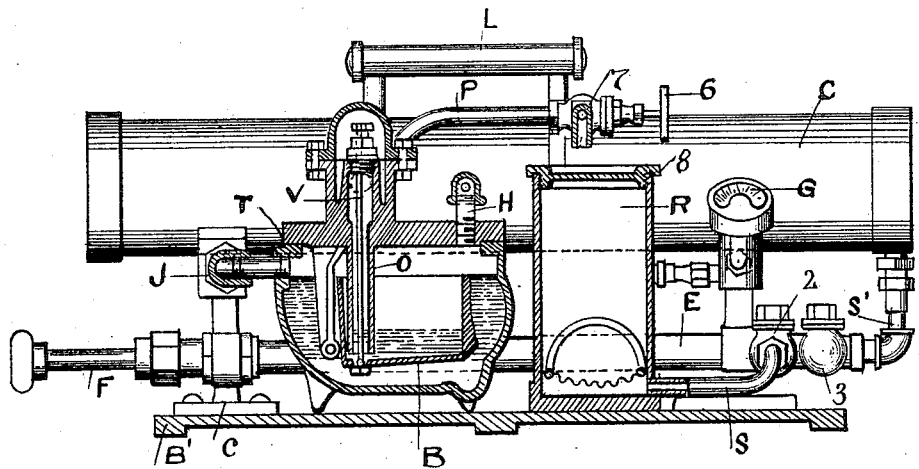
Figure 5:
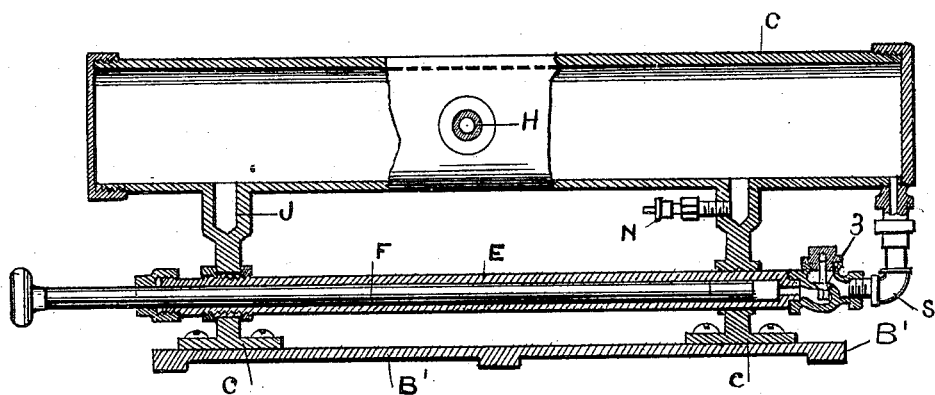

In the accompanying drawings, Figure 1 is a plan view of the complete device or apparatus, and Fig. 2 is a side elevation thereof sectioned in the gage cylinder. Fig. 3 is a cross section on line $x$—$x$, Fig. 2. Fig. 4 is a longitudinal sectional elevation on line $y$—$y$, Fig. 1, and Fig. 5 is a longitudinal sectional elevation on a line corresponding substantially to $z$—$z$, Fig. 3.

The trap as a whole is indicated by T and may be of any suitable style as steam traps are now made and found in the market and which operate more or less after the manner of the trap herein shown. In this trap there is a floating bucket B which automatically controls the outlet valve V as usual, and when the bucket becomes overloaded by overflow of the surrounding water into the bucket, the bucket is depressed and the valve V is opened and the water which has poured into the bucket is then forced out through the passage P by pressure from chamber T and may go to waste or be carried back to the boiler as may be provided for.

The foregoing description covers the usual construction and operation of a steam trap in steam pipe relations, and the particulars given simply serve to bring the said parts together in the present apparatus.

This apparatus or device is planned to use the water required for demonstrating purposes over and over again so as to make the device self contained and hence the water is delivered into a suitable receptacle R by or through pipe P from the trap and which receptacle is tapped at its bottom by a pipe connection S running to the base or lower end of the water pump. Said pump has a long narrow cylinder E beneath compressed air cylinder C and fixed in the supports $e$ thereof, and a correspondingly long and narrow piston F. The connection S has a check valve 2, Fig. 3, next to the entrance of said connection or pipe into the pump cylinder, and a further connection S' unites the base of the pump with the compressed air chamber or cylinder C and has a check valve 3, so that the end of the pump comes practically between the two valves 2 and 3 and which serve as check valves usually do in such relations. The pump is adapted to be operated by hand and serves to pump the water out of the receptacle R into the compressed air cylinder C and wherein it is presumed to sustain the same relation exactly as condensations in the usual steam pipe and from which it is trapped under usual and normal conditions by pressure from above. It will of course be apparent that the said cylinder C occupies the position and relation to the trap that an ordinary steam pipe does which is filled with steam and has the usual percentage of condensations which have to be taken care of and for which the traps are provided. In the present apparatus and in order to make the operation practically normal I employ compressed air in the said cylinder at a possibly low pressure of a few pounds up to fifty or more and so that the air pressure will act upon the water as the steam would act and give natural demonstrating conditions. A valved nipple N is provided through which to supply the cylinder with air, and it is planned that there shall be no loss of pressure through protracted demonstrations because the construction of the trap is such that there can be no escape of air from the same any more than there could be of steam, and the trap automatically cuts off the outflow of water by closing the valve V before the water in the bucket B sinks low enough to permit the air to escape with the water through the up pipe O. This in fact is of the very essence of the demonstration, because if it be shown that air at high pressure in the place of steam cannot escape it must conclusively follow that steam could not escape under the same or similar conditions. Now, as a proof of this observation and to convince a skeptical person that the trap does not permit loss or waste of steam by passing off through the condensed water channel F, P, a pressure gage G is provided and which is open to the air chamber C, and the degree of pressure of air in the said chamber is faithfully registered in this gage, whatever it may be. This then becomes a very important observation, and proves up the fact that the trap as such serves simply to trap condensations but does not absorb or waste steam, a point on which men are liable to be skeptical and which is liable to defeat sales. Hence this demonstration.

A pipe connection H from chamber C to the trap is constantly open to maintain air pressure in the trap, and a pipe J for the steam condensations in chamber or pipe C is constantly open to the said trap. Hence no water can remain in said chamber or pipe as the pressure will force it out, and being discharged into the trap it is automatically expelled therefrom by air or steam pressure. Air in this instance.

A hand controlled valve 6 is shown for the outflow pipe P, but ordinarily this channel is open for automatic operation. Said pipe is pivotally mounted in something of a swivel joint at its inner extremity which allows the same to be raised and lowered within limits and has a spout 7 which also is rotatable to get it out of the way and so as to make room for screw cap 8 upon the receptacle R. This cap is used only to confine water in the said receptacle when the device is carried about, see Fig. 4.

Any suitable pump arrangement to force water into chamber or tube C for demonstrating purposes may be used, and also any equivalent of said receptacle. For convenience I use the same water over and over again but not necessarily. I also build the trap body with glass lights 10 to disclose the inside operations, but this is not imperative.

A handle L serves to carry the device about.

The entire apparatus is mounted on a suitable base B′ and altogether need not weigh exceeding ten pounds, or even less, nor occupy a space exceeding twelve to fifteen inches in length. That is assuming that the present construction could be made. A tube or cylinder C is used to keep a correspondence between the same and a steam pipe and the trap is a commercial article, full size or less.

What I claim is:

1. A demonstrating apparatus comprising a steam trap and a compressed air chamber and fixed open connections between said chamber and said trap.

2. A demonstrating device comprising a chamber adapted to receive air under pressure, a steam trap, open pipe connections from said chamber to said trap, and means to force water into said chamber, said trap being provided with the usual exhaust.

3. A demonstrating device comprising a steam trap, a chamber adapted to hold air under pressure, separate water and air connections respectively connecting said parts, and means to force water into said chamber.

4. A demonstrating device comprising a steam trap, a compressed air chamber having open water and air passages respectively leading to said trap, a receptacle to receive the water from said trap and a pump and connections to force the water from said receptacle into said chamber.

5. A demonstrating device comprising a steam trap, a cylindrical chamber having inlet passages for water and air respectively to said trap, a water receptacle and a valve controlled passage from said trap to said receptacle and a valved water passage from said receptacle to said chamber.

6. A demonstrating apparatus for steam traps comprising a chamber adapted to receive an expansible fluid under pressure, a steam trap and a plurality of pipes open between said trap and said chamber for an uninterrupted flow of fluid through the same to the trap, means to force a liquid into said chamber and a pressure gage for said chamber.

7. The apparatus described having a cylinder adapted to contain air under pressure and a pump to force water into said cylinder, in combination with a steam trap and water and air passages respectively thereto from said cylinder, and a water receptacle adapted to receive the discharge from said trap and having valved connection with said pump.

In testimony whereof I affix my signature in presence of two witnesses.

CHARLES E. SQUIRES.

Witnesses:
E. M. Fisher,
F. C. Mussun.